Nov. 12, 1968     D. D. SCOTT ET AL     3,409,909
ATTACHING AND SEALING MEANS FOR FLASH GOGGLE LENSES
Filed June 21, 1966                    2 Sheets-Sheet 1
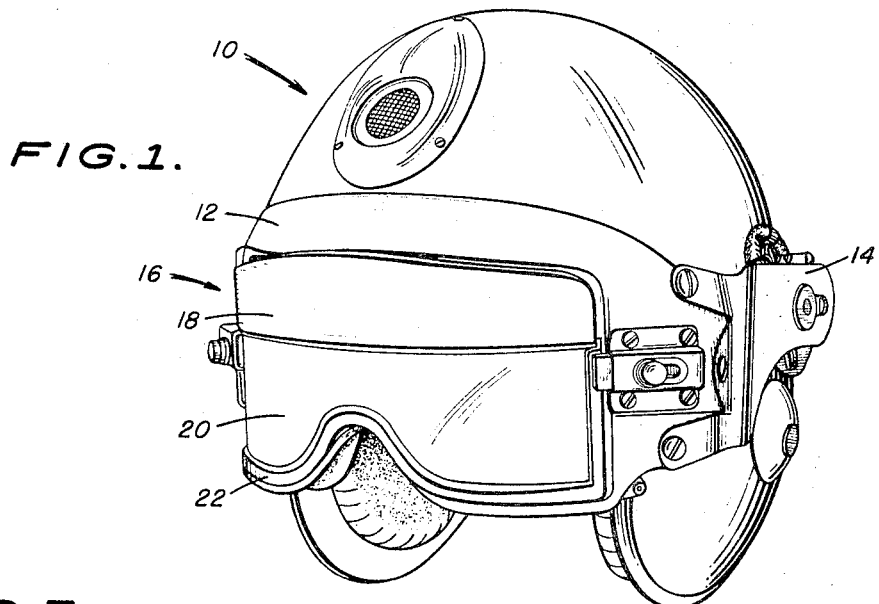
FIG. 1.
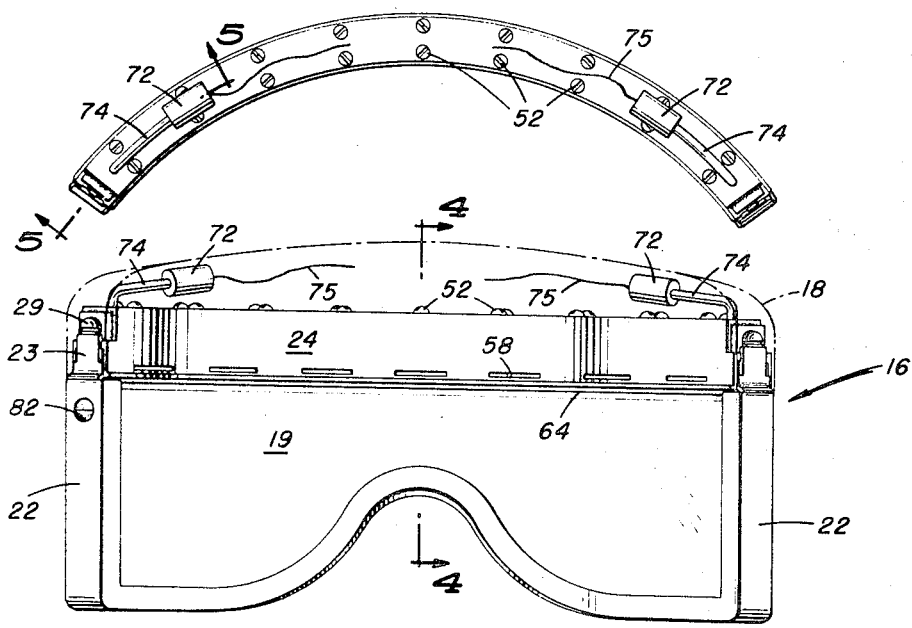
FIG. 3.
FIG. 2.
INVENTORS
DONALD D. SCOTT
WILLIAM J. ROEMER
BY
ATTORNEY

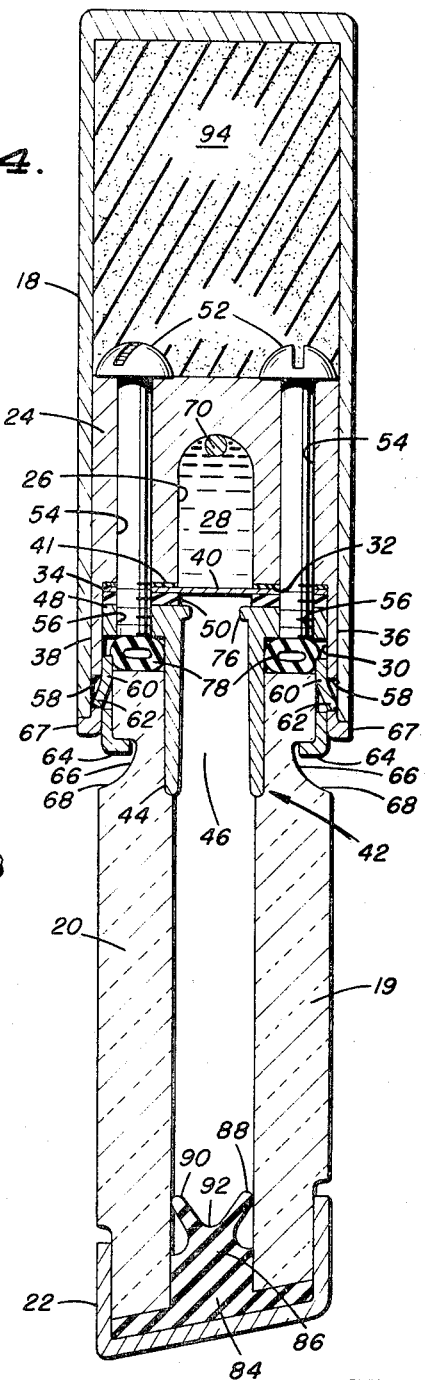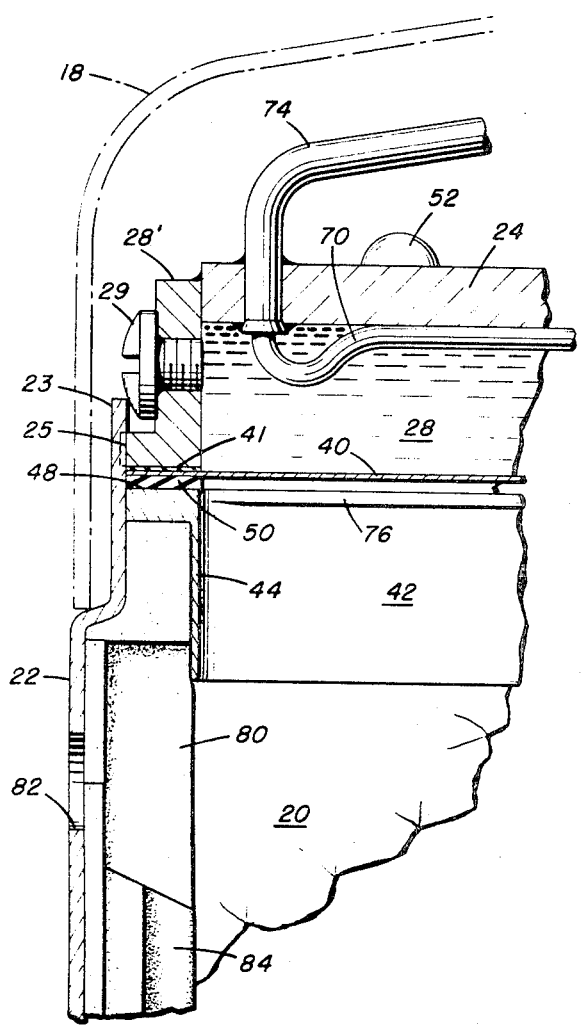
Nov. 12, 1968  D. D. SCOTT ET AL  3,409,909
ATTACHING AND SEALING MEANS FOR FLASH GOGGLE LENSES
Filed June 21, 1966  2 Sheets-Sheet 2
FIG. 4.
FIG. 5.
INVENTORS
DONALD D. SCOTT
WILLIAM J. ROEMER

United States Patent Office 3,409,909
Patented Nov. 12, 1968

3,409,909
ATTACHING AND SEALING MEANS FOR FLASH GOGGLE LENSES
Donald D. Scott, Silver Spring, and William J. Roemer, Baltimore, Md., assignors to the United States of America as represented by the Secretary of the Navy
Filed June 21, 1966, Ser. No. 560,381
3 Claims. (Cl. 2—14)

ABSTRACT OF THE DISCLOSURE

The invention relates to means for attaching and sealing a pair of arcuate lenses to the reservoir housing of an anti-flash goggle. The lenses are held in spaced relation to one another by a sub-housing having an orifice therein. The reservoir housing is equipped with outer shells which contiguously enclose the upper exterior surfaces of each lens. Said outer shells are notched to receive tabs extending from retainers located between each lens and each outer shell. The retainers are formed into an L-shape with the short leg of the L extending inwardly into a groove across the exterior surface of each lens. After assembly the lenses are sealed against the orifice housing by forcing a molded material between each lens and orifice housing. A plurality of screws pass through the lens housing whereby, on tightening said screws, the lens housing is sealed against the orifice housing.

---

The present invention relates generally to protective goggles. More specifically, the invention relates to a means for holding in spaced relationship a pair of lenses in an unstressed condition and for sealing them against damage from the explosive increase in pressure which is used for coating their opposed inner surfaces with an opaquing fluid to protect the wearer of said goggle from flashblindness and retinal burns that would be caused by the sudden high intensity flash from an atomic detonation.

The recent development of atomic flashblindness protective equipment includes the production of goggles which utilize explosives to actuate a means which will occlude the transmission of incident light from an atomic detonation. Unfortunately, goggle lenses which provide desirable optical characteristics do not possess structural qualities adequate to withstand the explosive forces when incorporated into the goggle by conventional fastening means. For example, the use of screw fasteners for securing the lenses in place would lead to potential failures of the lenses in either flight or storage environments.

It is therefore an object of the invention to provide a sealing means for flash goggle lenses which does not cause structural stress concentrations in the lenses thereof.

Another object of the invention is to provide a dependable sealing means for flash goggle lenses which will prevent leakage of an opaquing fluid explosively projected onto the lens surfaces for occluding the transmission of light therethrough.

Still another object of the invention is to provide an attaching and sealing means for flashblindness goggle lenses which is easy to manufacture and which may be readily incorporated into a removable goggle lens frame assembly.

Other objects and many of the attendant advantages of the present invention will be readily appreciated as the same becomes better understood by reference to the following detailed description when considered in connection with the accompanying drawings, wherein:

FIG. 1 is a perspective view of a protective helmet and an associated visor and goggle assembly which incorporates the invention;

FIG. 2 is a front elevation of the goggle assembly with its housing cover shown in phantom and showing a lens surrounded on three edges by a lens frame and capped by a reservoir housing;

FIG. 3 is a top view of the goggle assembly of FIG. 2 with the housing cover removed;

FIG. 4 is a vertical section on the line 4—4 of FIG. 2 with the housing cover shown in full lines; and FIG. 5 is an enlarged detail section of a portion of the device, on the line 5—5 of FIG. 3 with the housing cover shown in phantom.

The flash protecting goggle assembly is provided with a housing having a reservoir for storing a fluid carrier having colloidally suspended graphite particles therein. When the flash from an atomic blast occurs, a pulse generated from a sensing circuit will activate a detonator which provides an impulse to an explosive charge which will rupture a frangible diaphragm covering the reservoir. The colloidally suspended carbon will be turbulently forced between a pair of spaced arculate lenses, thereby coating the inner surface of each lens to prevent the transmission of light therethrough. The reservoir housing has a channeled lower portion providing vertically extending flanges which contiguously enclose the upper exterior surfaces of each lens retained therein. The lenses are maintained in spaced relationship by an orifice housing also located within the channeled portion of the reservoir housing. The flanges of the channeled portion are slotted to receive bent tabs extending from spring clip retainers inserted between each lens and the adjacent retaining flange of the reservoir housing. The retainers also have extended flanges bent inwardly into a groove machined across the exterior surface of each arcuate lens. Machine screws pass through the reservoir housing and threadably attach to the orifice housing, whereby the tightening of the screws clamps the orifice housing into sealing engagement against the reservoir housing. The top edge of each lens is sealed against the orifice housing by a resilient deformable pressure seal, the spring clip retainers holding said lenses in sealing engagement against said seal. The resilient seal reacts against said lenses and said orifice housing to firmly seat the tabs of the clip retainers in the bottom portions of their respective grooves. The remaining inner surfaces of the lenses are maintained in spaced relationship by a lens closure assembly comprising a molded seal, a portion of which is insertable between the lower horizontal and side edges of the lenses, and a lens frame having a channeled cross-section receiving the lenses with each channel wall fitting over the outer perimeter of its respective lens. Each end of the molded seal abuts against an end closure seal which is bonded to each end of the orifice housing. The goggle assembly is completed by a housing cover which fits over the reservoir housing and encloses an explosive charge and its associated wiring.

With more particular reference to the drawings, FIG. 1 shows a protective helmet 10 having a protective visor 12. The visor 12 is pivotable about a mounting structure 14 from the eye level position of the helmet, to facilitate the wearer's easy access thereto. The visor 12 provides a recessed mounting for a removable goggle assembly 16. The goggle assembly 16 includes a housing cover 18, a pair of lenses 19 and 20, as more clearly shown in FIG. 4, and a lens frame 22. The lenses 19 and 20 are each made from a colorless polycarbonate thermoplastic such as "Lexan" and are molded to an arcuate configuration to conform substantially to the contour of a wearer's head at eye level. An indented portion is provided in each lens, centrally in the bottom edge of an arcuate surface thereof, to receive the nosepiece of any conventional oxygen mask. As shown in FIG. 4, mounted contiguously within the housing cover 18 is an arcuate reservoir housing 24, having an inverted groove 26 extending substantially the length of the arcuate dimension of the reservoir structure. The groove 26 provides a reservoir for storing a carrier fluid 28, such as an oleic nitrile compound having therein colloidally suspended graphite particles. As shown in FIG. 5, the reservoir is sealed at each of its ends by an L-shaped end block 28 suitably attached by any conventional means such as welding. A screw 29 is provided in each end block 28' to close a hole through which the reservoir 26 is filled. The reservoir housing has an inverted channel 30 which opens into the reservoir 26 and which provides, on each side of the reservoir housing 24, horizontal bearing surfaces 32 and 34. The bearing surfaces 32 and 34 respectively terminate in depending flanges 36 and 38 which receive and contiguously enclose the upper exterior margins of the lenses 19 and 20 respectively.

A thin frangible seal 40, which may be of 0.0007 inch thick copper foil, closes the reservoir 26 at its lower end and is seated on a gasket 41 covering the flat bearing surfaces 32 and 34 adjacent the reservoir 26.

Mounted contiguously within the channel 30 is an orifice housing 42, also of arcuate configuration, matching the arcuate shape of the channel 30. The orifice housing 42 includes a vertical arcuate side wall 44 having an orifice 46 extending substantially throughout its length but terminating a short distance from each end thereof. The housing 42 thus forms a continuous thin-walled shell about said orifice 46. At its upper end the housing 42 is formed with an outwardly extending flange 48 which surrounds the upper end of the orifice 46 and engages a sealing gasket 50. As shown in FIGS. 2 through 5, a series of elongated screws 52 pass through corresponding vertical clearance holes 54 spaced along the arcuate dimension of the reservoir housing 24 and adjacent each side of the reservoir 26 thereof. The screws 52 are passed through the gasket 41, the frangible seal 40 and the sealing gasket 50, and are threadably secured into mating tapped holes 56 in the flange 48. The screws 52 connect the reservoir housing 24 and the housing 42, with the gasket 41, the seal 40, and the sealing gasket 50 clamped tightly therebetween. The carrier fluid 28 is thus housed within the arcuate reservoir 26 prior to its discharge along the arcuate dimension thereof by an explosive shock in a manner to be hereinafter described. The orifice 46 communicates with the reservoir 26 to permit the explosive flow of the graphite particles within the carrier fluid 28 upon the opposed inner surfaces of the lenses 19 and 20, thus to occlude the transmission of high-intensity light therethrough. Both the reservoir housing 24 and the orifice housing 42 are constructed of a material suitable to withstand the sudden explosive shock utilized to discharge the carrier fluid 28.

The arcuate lenses 19 and 20 are in abutting relationship with the arcuate side wall 44 of the orifice housing 42 and are thereby maintained in spaced relationship for enclosure at their upper margins by the vertically extending flanges 36 and 38 of the reservoir housing 24.

As shown in FIGS. 2 and 4, each of the vertically extending flanges 36 and 38 has a plurality of horizontally spaced slots 58. An elongated lens retainer clip 60 is inserted between each of the flanges 36 and 38 and its respective lens 19, 20. Each of the retainer clips 60 has a plurality of tabs 62 which engage in the spaced slots 58 in the flanges 36 and 38. An elongated inwardly directed flange 64 is provided on the lower end of each of the retainer clips 60 and is retained in a groove 66 machined across the arcuate exterior surface of each of the lenses 19 and 20. Each of the grooves 66 has a relieved portion at 68 for permitting the passage of the flange 64 past the exterior surfaces of the lenses. The retainer clips 60 maintain the lenses in clamped relationship against the orifice housing 42 without inducing stress concentrations which would tend to cause rupture of the lenses during the explosive discharge of the carrier fluid 28. As best seen in FIG. 4, the lower end portions of the depending flanges 36 and 38 are turned outwardly to define stops 67 for the lower ends of the side walls of the housing cover 18.

As more clearly shown in FIG. 5, a mild detonator fuze 70 is attached to the roof of the reservoir 26 and extends substantially the entire length thereof. Each end of the fuze 70 is connected to a detonator 72 through a tube 74 (FIG. 2), located at each end of the reservoir housing 24. A pair of electrical leads 75 connect the detonators 72 to an electromagnetic sensor (not shown) which is located externally of the goggle assembly and at a convenient distance therefrom. When an atomic blast occurs, the externally located sensor actuates the detonators 72 which produce high velocity impulses through the tubes 74 to explosively ignite the detonator fuze 70.

As shown in FIG. 4, the reservoir 26 is entirely filled with the carrier fluid 28 such that, when the detonator fuze 70 is explosively actuated, an immediate build-up of fluid pressure within the reservoir will rupture the frangible seal 40 and discharge the carrier fluid 28 into the orifice 46 along substantially the entire arcuate dimension thereof.

A lip 76 is provided along the opening of the orifice to create an area of low pressure immediately beneath said opening and to provide a nozzle for causing turbulent dispersion thereafter of the discharged carrier fluid, which insures an evenly distributed progressive coverage of the inner surfaces of the lenses 19 and 20.

The vertically extending inner surfaces of the orifice 46 provide flow surfaces for the carrier fluid 28 explosively discharged from the reservoir 26. These surfaces provide an area of progressively decreasing pressure in advance of the discharged carrier fluid 28 to facilitate quick progressive coverage of the inner surfaces of the lenses 19 and 20.

To provide dependable seals to prevent escape of the explosive flow of the carrier fluid, the top surface of each lens and the lower surface of the continuous horizontal flange 48 are fastened by epoxy in sealing engagement by a strip 78 of a suitably resilient elastomeric material. The strips 78 extend continuously along the bottom of the horizontal flange 48 throughout its length and are elliptical in cross-section. The lens clip retainers 60 compress the top edges of the lenses into sealing engagement with the elastomeric strips 78, causing them to deform. The resilient action of the elastomeric strip 78 against the bottom of the horizontal flange 48 and the top edges of the lenses causes the tabs 62 of the lens retainer clips 60 to seat positively in the lower portions of their respective slots 58, thereby maintaining the lenses 19 and 20 in clamped relationship against said orifice housing 42. As shown in FIG. 5, an end closure seal 80 is attached by any conventional means, such as epoxy, to each end of the orifice housing and is compressed in sealing engagement against the ends of the elastomeric strips 78. The end closure seals 80 are inserted between the lenses 19 and 20 to complete the sealing arrangement of the lenses 19 and 20 at their upper surfaces thereof. As shown in FIGS. 2 and 5, a hole 82 is provided in the lens frame through which a needle may be inserted for the purpose of filling the space between the lenses 19 and 20 with pressurized gas to test for leakage of the goggle assembly.

To complete the seal against explosive escape of the carrier fluid 28, the lenses are rimmed at their bottom and transverse edges by a lens closure assembly comprising the lens frame 22 and a lens closure seal 84. The lens frame 22 has a channel-shaped cross-section for fitting over the perimeter of the outer surfaces of each lens and is fastened by epoxy at each end to one of the end closure seals 80. A flange 23, extending from each end of the lens frame 22, compresses a portion of each end seal 80 against the arcuate side wall 44 of the reservoir housing 42 and engages the L-shaped end block 28', suitably notched at 25 to receive said flange 23. The lenses are maintained in spaced relationship and against the lens frame 22 by an extended portion 86 of the closure seal 84 disposed between the lenses. Said extended portion has a pair of oppositely directed beads 88 and 90 on each side of a groove 92. The explosive flow of carrier fluid 28 into the groove 92 compresses the beads 88 and 90 tightly against the inner surfaces of the lenses 19 and 20, thereby forming an effective seal against the escape of the pressurized carrier fluid 28. As shown in FIG. 5, each end of the closure seal 84 abuts in sealing engagement one of the end closure seals 80.

The housing cover 18 is mounted over the reservoir housing 24 and encloses the detonator 74 and its electrical leads 75. A filler material 94, such as Adiprene, fills the remainder of the housing cover 18 to prevent movement of the detonator 72 and to seal the housing cover to the reservoir housing 24.

Obviously, many modifications and variations of the present invention are possible in the light of the above teachings. It is therefore to be understood that within the scope of the appended claims, the invention may be practiced otherwise than as specifically described.

What is claimed is:

1. In combination with a goggle having a pair of spaced lenses each having a groove formed in its outer margin near its upper end and container means positioned above said lenses and having depending flanges adjacent the upper margins of said lenses, said flanges having slots,
   means connecting each of said lenses with an adjacent flange,
   said last-mentioned means including tabs engaging in said slots and flanges engaging in said grooves,
   an orifice housing below said container means and having a wall extending between said spaced lenses and having a flange,
   resilient means compressed between each of said lenses and said flange for positively urging said tabs to seat in said slots,
   means affixed to each end of the orifice housing for sealing the upper margins of said lenses to said orifice housing,
   a frangible seal between the container means and the orifice housing,
   means securing the container means and the frangible seal in abutting relation to the orifice housing,
   an opaquing medium in said container means, and
   explosive means disposed within the opaquing medium and operable upon explosion for forcibly ejecting said medium through the frangible seal and onto the inner surfaces of the lenses.

2. The structure of claim 1, and further including
   lip means on said orifice housing for causing turbulent fluid flow from said container means onto the opposed inner surfaces of said lenses.

3. The structure of claim 1, and further including means for closing the goggle at the lower and side edges of the lenses,
   said closing means comprising a lens closure seal having an extended portion disposed between said lenses,
   said extended portion having oppositely directed beads engaging said lenses.

References Cited

UNITED STATES PATENTS

| | | | |
|---|---|---|---|
| 2,640,980 | 6/1953 | Prupis | 2—6 X |
| 3,148,543 | 9/1964 | LeRoy | 73—331 |
| 3,152,215 | 10/1964 | Barstow et al. | 350—160 |
| 3,335,720 | 8/1967 | Aileo | 2—6 X |
| 3,342,540 | 9/1967 | Abegg | 350—160 X |

HERBERT F. ROSS, *Primary Examiner.*